(12) United States Patent
Barthakur

(10) Patent No.: US 10,480,401 B2
(45) Date of Patent: Nov. 19, 2019

(54) IMPLOSION ENABLED ENGINE OF EXOTHERMIC TYPE IN EXPLOSIVE SYSTEM (IEEX-EX) EMPLOYING A SAFE PIPE SYSTEM (SPS) AND OTHER SAFETY DEVICES

(71) Applicant: Jitendra Kumar Barthakur, New Delhi (IN)

(72) Inventor: Jitendra Kumar Barthakur, New Delhi (IN)

( * ) Notice: Subject to any disclaimer, the term of this patent is extended or adjusted under 35 U.S.C. 154(b) by 242 days.

(21) Appl. No.: 14/888,082

(22) PCT Filed: Oct. 21, 2014

(86) PCT No.: PCT/IN2014/000672
§ 371 (c)(1),
(2) Date: Oct. 29, 2015

(87) PCT Pub. No.: WO2015/063789
PCT Pub. Date: May 7, 2015

(65) Prior Publication Data
US 2016/0230652 A1    Aug. 11, 2016

(30) Foreign Application Priority Data

Oct. 30, 2013   (IN) .......................... 3216/DEL/2013
Aug. 4, 2014    (IN) .......................... 2203/DEL/2014

(51) Int. Cl.
*F02B 43/00*     (2006.01)
*F02M 21/02*     (2006.01)
(52) U.S. Cl.
CPC ......... *F02B 43/00* (2013.01); *F02M 21/0206* (2013.01); *F02M 21/0227* (2013.01); *F02M 21/0293* (2013.01); *Y02T 10/32* (2013.01)

(58) Field of Classification Search
CPC ................ F02B 43/00; F02M 21/0293; F02M 21/0206; F02M 21/0227; Y02T 10/32
See application file for complete search history.

(56) References Cited

U.S. PATENT DOCUMENTS 2,496,623 A   2/1950  Fragale
4,389,981 A   6/1983  Meyer
(Continued)

FOREIGN PATENT DOCUMENTS

WO   WO-2003/069142   8/2003
WO   WO-2011/125064   10/2011

OTHER PUBLICATIONS

International Search Report and Written Opinion for PCT/IN2014/000672, dated Jun. 3, 2015, 7 pages.
(Continued)

*Primary Examiner* — Hung Q Nguyen
(74) *Attorney, Agent, or Firm* — Morrison & Foerster LLP

(57) ABSTRACT

The present subject matter discloses the concept of multiple engine heads for one cylinder operating as Serially Operating Internal Combustion (SOIC) engine using Safe Pipe System (SPS) and other integrated systems, viz., Interim Storage of Gas (ISG) and Pre-Disposal Exhaust Treatment (PDET). SPS is in the form of a chamber having a main pipeline segregated into different interconnected SGC segments allowing and disrupting the flow of substantially pure H2 and substantially pure O2 gas in cold condition through the main pipeline; on receipt of command. SOIC includes at least one cylinder (32) and a plurality of engine heads (311, 312) filled with water; the gas entering the engine head in required volume forms a bubble in upper part of the engine head causing the sparking assemblies (51, 52) to ignite and create implosion first and explosion next in the engine heads; pushing the pistons (411, 412) and transmitting the
(Continued)

force of explosion to the crankshaft assembly (431, 432) to produce torque or the force of explosion generated by IEEX-EM expelling the water out of cylinder (32) with high pressure being used for rotating turbine or for throwing projectile to produce energy.

8 Claims, 7 Drawing Sheets

(56) References Cited

U.S. PATENT DOCUMENTS

| | | | |
|---|---|---|---|
| 6,786,245 B1* | 9/2004 | Eichelberger | B60S 5/02 141/18 |
| 2002/0046773 A1* | 4/2002 | Bishop | B63B 25/14 137/259 |

OTHER PUBLICATIONS

International Preliminary Report on Patentability for PCT/IN2014/000672, dated May 3, 2016, 5 pages.

* cited by examiner

IMPLOSION ENABLED ENGINE OF EXOTHERMIC TYPE IN EXPLOSIVE SYSTEM (IEEX-EX) EMPLOYING A SAFE PIPE SYSTEM (SPS) AND OTHER SAFETY DEVICES

TECHNICAL FIELD

The subject matter of the present description relates to use mainly substantially pure hydrogen and substantially pure oxygen as fuel and the energy generated on combination of H2 and O2 in implosion-enabled engine of exothermic type in explosive model IEEX-EM that utilises the principles of internal combustion (IC) engine having at least one piston and one cylinder provided that the piston is dispensable when water or gas exits with force through the end of cylinder opposite to where IEEX-EM explosion takes place to rotate turbine or throw projectile using the power of explosion. More specifically, the subject matter of the present description relates to one or more engine heads for one cylinder (termed as "Serially Operating Internal Combustion" (SOIC)) employing various safety measures named separately and identified as described herein.

BACKGROUND

Internal combustion engines operating with hydrocarbons and other type of fuels are known in art. The latter adaptations of internal combustion engines using pre-mixture of $H_2$ and $O_2$ or HHO and air are known in art as explosion-prone in storage and transportation of fuel.

The latter adaptations, additionally, did not prove to be technologically and commercially viable for the reason that air contains not only $O_2$ but also nitrogen and carbon-dioxide. $H_2$ and $O_2$ combines very fast and the combination is implosive and exothermic. The combination produces steam ($H_2O$; water) and dissipates heat at very high temperature to interact with nitrogen and carbon and produce a multitude of oxides, acids, cyanide, other chain and ring products that are often poisonous in nature. The molecular structures of these compounds are larger than the molecular size of $H_2O$ and they further interact with each other and often become explosive.

Acids corrode and erode the combustion chamber and piston head that affect the fitment of the engine parts and result in adverse effects such as lowering the efficiency of the intended dynamic outcome of the IC engine.

The internal combustion engines using the abovementioned combination of fuels are though capable of transmitting torque for different applications and now it is a known technology failures in the art because of the pollution produced by such engines which is beyond acceptable limits; and the explosion proneness of such systems as stated before.

In addition, known systems face the problems of foulness of the exhaust, backfire of hydrogen and other issues.

In view of foregoing, it becomes essential to overcome the safety hazards caused by the combination of $H_2$ and $O_2$ in an IC engine.

The present subject matter provides independent safety measures of "safe pipe system" (SPS), "interim storage of gas" (ISG); and "pre-disposal treatment of exhaust" (PDTE) as a way to efficiently store and transport gas from one place to another in any system that use or transport or handle $H_2$ or HHO; store gas safely prior to use; dispose exhaust after removing the contamination; and SOICs reduce the pollution of content and accident proneness of engines. It is also intended to produce hydrogen and oxygen gases inside or close to the engine head, eliminating the need of a separate transportation system and the associated safety hazards.

SUMMARY

It is an object of the present subject matter to provide an apparatus for safe transportation of gas within the system in the form of safe pipe system (SPS).

It is another object of the present subject matter to provide a flexible device in the form of intermediate storage of gas (ISG) for storing gas at the intermediate level prior to use.

It is yet another object of the present subject matter to provide a system in the form of pre-disposal treatment of exhaust (PDTE) ensuring safety at the stage of disposal of exhaust gases.

It is yet another object of the present subject matter to produce $H_2$ or HHO and $O_2$ gases by electrolysis of salt water inside or close to the engine head.

It is a further object of the present subject matter to have a sliding or rotating bottom for an engine head to hold water inside EH against gravity and make room for the gases as the volume of gases increases and the pressure of the injected gases requires adjustment with the screwing property of the EH and attachment.

The instant application relating to the use of power and the instantaneity of the union of $H_2$ with $O_2$, differs from the technology that used air or gases containing $O_2$. The variance is that of using $H_2$ and $O_2$ in substantially pure form and in cold conditions to eliminate the effects of mutual union of $H_2$, $O_2$, $N_2$, C etc. from forming toxic oxides of N, $HNO_3$ and other acids, the poisonous combines in CN products and so on. A system forming a part of the present application is not only pollution-free but also environment friendly. Further, the instant application differs from the current belief that in $2H_2+O_2=2H_2O+572$ kJ, the role of water is extraneous (liquid; and to be drained out in several older concepts) in transforming the exothermic power to dynamism. The system as employed in the present application makes a breakthrough understanding in terms that the imploded and the contracted volume of $H_2O$ (gas) after implosion expands instantaneously by exothermic heat; and it is the instantaneity that causes $H_2O$ gas explosion with the sudden increase in volume of the $H_2O$ gas. Observably, there is no perceptible rise in temperature while the explosion is over. The explosion absorbs all the exothermic energy.

In electrolysis, two KWH (1 KWH=$3.6 \times 10^3$ KJ) produces 4 g of $H_2$ (older calculations). One mole of $H_2$ occupies 22.4 liters at STP (273K, $10^5$ pascals). 44.8 liters of $H_2$+22.4 liters of $O_2$=67.2 liters of gas produced in electrolysis create on ignition 48.8 liters of steam equivalent at STP plus energy per second. $3.6 \times 10^6$ kJ=1 MW h (conversion table). Taking an instant of explosion as 0.01 part of a second, 3.6/2 kJ instant=$60/2 \times 10^{-3}$ MW h=0.03 MW h. ($572 \div 4$=) 143 kJ from 48.8 liters of $H_2O$=$143 \times 0.03/3.6$=1.19 MW h. The power of explosion P≡1 MW his generated by $48.8 \div 1.19$=41 liters of stream or about 56 liters of $H_2$ and $O_2$ mixture at STP that no more than 0.8 KWH electricity electrolyses from water. In other words, the input-output ratio is at least 1:1000 in the use of, say, engine-head in FIG. 10 in WO 2015/063789 A2 that ensures absolute safety of the system.

The present subject matter described herein relates to a Serially Operating Internal Combustion (SOIC) engine that includes at least one engine cylinder having at least one end positioned as operating head. The operating head is provided with at least one inlet port and at least one exhaust port for drawing in fuel and forcing out exhaust. An igniting means is spark that provides electrical contraption in the manner as known in the art. SOIC stays submerged in water to harvest heat generated by the running of SOIC and the operating engine head stays filled with cold water internally to prevent steam replace liquidity of water.

In one embodiment of the present subject matter, the fuel drawn into the engine head comprises substantially pure $H_2$ and substantially pure $O_2$ in cold condition and in a compressed state; or in a purified state of HHO in at least one inlet port. Predetermined proportion of two parts of $H_2$ gas and slightly more than one part of $O_2$ become operative so that $H_2$ unites completely with $O_2$ within the engine head when sparking takes place.

In another embodiment of the present subject matter, the prime unit of gas storage and its assembly regulates gas inlet in appropriate quantity; temperature; pressure and state of purity into an Interim Storage System (ISG) through Safe Pipe System (SPS).

In another embodiment of the present subject matter, the initial transfer of gas to ISG through SPS is desirable for transferring at a time that amount of gas that is required for one explosion inside each engine head (EH); maintaining the pressure of gas required for pushing gas through SPS to EH; maintaining the adequate speed of transmission of gas; and separate and distinct SPS unit connects the main source of gas to one ISG and one ISG to one EH.

In another embodiment of the present subject matter, SPS is a pipe system operating in separate segments and configured in several ways; one way being the use of cylinder grooved at centre (SGC); groove being split along the length to sustain open-shut operation throughout the length. Several segments of SGC make up the length of SPS. Each segment of SGC functions independently of another so as to delink the continuity of SPS when required; and flush and clean every segment of SGC with inert gas flowing through it.

In one embodiment of the present subject matter, one main cylinder allows more than one piston to transmit power to more than one crankshaft assembly creating torque out of more than one crankshaft assembly.

In one embodiment of the present subject matter, at least one cylinder and one EH may use water pressure to rotate at least one turbine or throw at least one projectile using the power of explosion.

In one embodiment of the present subject matter, more than two pistons work attached to one cylinder of IC.

In another embodiment of the present subject matter, it is aimed to achieve an improvised valve mechanism (precise valve timings) that helps overcome a severe problem of gas escaping through valves before the valves are mechanically shut and causing explosion and damage to the neighbourhood. The ordinary valve systems known in the art are incapable of regulating such escaping of gas (occurring because of the fast union of $H_2$, HHO and $O_2$ or other oxidising agents) before the valves are completely shut.

Therefore, one embodiment of the present subject matter focuses on increasing the duration between two consequent gas explosions in two or more engine heads (EHs) connected to one common cylinder (CC) generating time between two or more explosions to allow valves to shut down properly and securely in one EH after another or yet another or more EHs.

In another embodiment of the present subject matter, serially operating internal combustion (SOIC) connects at least two or more EHs to CC through trap doors. CC and EHs stay completely filled with water. When gas for explosion enters the first engine head (EH1), a bubble is formed in water on top of EH1 setting the sparking device of EH1 free from submersion in water. Explosion pushes the water from EH1 to CC after trap door closes to isolate the second engine head (EH2); and push common piston set (CPS) to activate locomotion in the manner as known in the art. Liquid transmits force more efficiently than air. After occurrence of explosion, chilled water completely refills EH1 and EH2. Gas then enters EH2 and forms a bubble on top of EH2 to explode and activate CPS again. The process repeats in the subsequent engine heads; if there are more than two EHs. This serial operation in SOIC allows time to EH1, EH2, EH3, EH4 or more EHs to go repetitively through the process described; also performing the shut-open operation of the valves with absolute finality, to enable all connected devices to sustain serial explosions in turn. The continuous implosion first and the explosion next phenomenon inside SOIC places the pistons in most desirable position before explosion and produces continuous torque out of the system.

In yet another embodiment of the present subject matter, SOIC IEEX-EM (implosion enabled engine of exothermic type in explosive model) stays all the time submerged in water principally to harvest heat.

In another embodiment of the present subject matter, the water inside SOIC IEEX-EM remains at liquid state below 100° C. so that the role played by the liquidity of water inside Ens does not alter. After each explosion, chilled water presses in and refills EHs and CC internally to keep temperature inside the engine below 100° C. though water surrounding the engine reaches temperature higher than 100° C. When IEEX-EM produces power, the pressurised water and steam surrounding the engine goes to fill bigger containers. These containers are capable of withstanding high temperature and pressure and they take no part in running the engine except in receiving hot water encasing the engine. The engine itself may externally power, as for example, generators producing electricity. The hot water and steam inside the bigger containers are heated to about 200-400° C. to run steam turbines at appropriate pressure in the manner as known in art. The hot water fed in the containers may be used to perform several other jobs as known in the art.

In another embodiment of the present subject matter, the spark plug is so devised that ignition takes place even when the sparking device is wet.

In one embodiment of the present subject matter, multiple system of crankshaft assemblies work with the energy generated by a single source of one engine.

In one embodiment of the present subject matter, a common central crankshaft operates between the two rows of SOIC.

A method of operating SPS, which forms the essence of transporting gas from one place to another, is in conceptualising segments of SPS that can be detached and interrupt the flow of gas for sanitising the pipe system. The configuration can be of a solid cylindrical shape with a lengthwise groove in the centre (SGC) that slices the cylindrical shape lengthwise in the centre ensuring sameness on both sides of the sliced length. SGC halves open on receiving command to disrupt the gas flow and shut to enable the continuity of the passage that the closed groove and pieces of usual pipes create. This continuity gets disrupted when the grooves open. At that stage, the entire lot of pieces of pipe of SGC are sanitised with inert gas. Notwithstanding anything stated above; and inclusive of all modifications person skilled in art may devise, SGC on command closes to act as a part of a pipe system; and opens to disrupt the continuity of flow through the pipe system. On emergency, SPS cuts down the entry and exit valves of the affected segment of SPS that triggered the alarm, opens SGC in all segments of the system and let the system shut down in the ways as known in the art.

An ISG is intermediary containment of gas to let SPS connect the main source of gas (MSG) to a smaller storage in a flexible sack. The flexible sack can contain required volume of gas (RVG) predictably to claim transportation to one specific EH i.e., each ISG serves only one EH. When RVG enters ISG, valves close the passage of gas at both ends of SPS i.e., from MSG to SPS and SPS to ISG. The flexible device inside ISG uses a bellow type contraption to let gas move from ISG to EH in a huff through SPS. Gas enters EH and replaces water present in EH to form bubble on top of EH in the least possible time. After RVG has entered EH and ISG has closed its outlet valve, EH closes valves to discontinue entry of gas into EH. Thereafter, enough time is available to cleanse SPS between ISG and EH and MSG and ISG.

A method of operating SOIC starts by keeping engine head 1 (EH1) completely filled with water and refilled with chilled water. SOIC of which EH1 is part, stays submerged in water. When gases enter EH1; a bubble of explodable gas is formed in the upper part of EH1 and bubble encloses the sparking device which activates only after the bubble has achieved RVG. On receipt of specific command; spark activates to create implosion first and explosion next inside the bubble while all valves stay closed and hatch separating EH1 and CC opens and stay fixed. The explosive power pushes piston(s) with hydraulic transmission of power and as piston(s) return to their original position(s) through mechanical means known in the art; gas enters EH2 to form gas bubble up to its RVG stage and undergo the same process as EH went through. Simultaneously and independently of the happenings in EH2, water valve opens to fill EH1 and CC with chilled water; and exhaust valve opens to drive all trace of gas inside EH1. Hatch secures EH1 separating EH1 and CC while the hatch separating EH2 and CC opens and stay fixed until explosion takes place inside EH2. All EHs act likewise turn-after-turn to make the piston and crankshaft assemblies produce torque.

The present subject matter also describes an engine head IEEX-EH (900) of a serially operating internal combustion (SOIC) engine. The engine head is provided with at least one inlet for water and at least one inlet for fuel gases $H_2$ or HHO and $O_2$ respectively. The engine head is also provided with at least one outlet for exhaust gases. There is also provided at least one top water level and at least one bottom water level sensor for measuring water quantity and, regulating requirement of water in the engine head IEEX-EH (900). The fuel gases $H_2$ or HHO and $O_2$ replaces water in the engine head IEEX-EH (900) on command of the top water level sensor (102) and rise as bubbles to acquire required volume of gas in an upper part of the engine head IEEX-EH (900). The engine head also has at least one sparking assembly for creating explosion inside the engine head.

The present subject matter further describes an engine head IEEX-EH (901) of a serially operating internal combustion (SOIC) engine. The engine head is provided with at least one inlet and at least one outlet for salt water; and at least one outlet for exhaust gases. There is also provided at least one top water level and at least one bottom water level sensor for measuring salt water quantity and, regulating requirement of salt water in the engine head IEEX-EH (901). The engine head is further provided with an electrode assembly in close proximity. The electrode assembly is provided for electrolysis of salt water, thereby producing fuel gases $H_2$ or HHO and $O_2$ in the engine head IEEX-EH (901). The fuel gases $H_2$ or HHO and $O_2$ produced thereof rise as bubbles to acquire required volume of gas in an upper part of the engine head IEEX-EH (901). The engine head also has at least one sparking assembly for creating explosion inside the engine head.

In one embodiment of the present subject matter, a tube attached to or acting as an extension of the engine head is directed to rotate or screw.

In another embodiment of the present subject matter, the screwing of the tube is intended to deliver required volume of fuel gases in an upper part of the engine head.

In yet another embodiment of the present subject matter, a lower end of the tube of the engine head is closed with a sliding device in order to hold water against gravity.

In yet another embodiment of the present subject matter, the lower end of the tube of the engine head remains closed until ignition takes place.

In yet another embodiment of the present subject matter, the lower end of the tube of the engine head is open to push out water and air after explosion caused by ignition of gases.

In yet another embodiment of the present subject matter, the electrode assembly is placed on sides of the engine head.

These and other advantages and features of the present subject matter are described with specificity to make the present subject matter understandable to one of ordinary skill in the art.

BRIEF DESCRIPTION OF ACCOMPANYING DRAWINGS

The foregoing and further objects, features and advantages of the present subject matter will become apparent from the following description of example embodiments with reference to the accompanying drawings, wherein like numerals are used to represent like elements and wherein:

FIGS. 1 (A), 1 (B), 1 (C), 1 (D) & 1 (E) are schematic representation of different stages of working of Safe Pipe System (SPS) or IEEX-SM (111) SPS, which is Safe Measure (SM) as conceived and tried in real research and experiments. SPS is a key device to run any engine with $H_2$ or HHO gas, and is in accordance with an embodiment of the present subject matter.

Figure 4A:
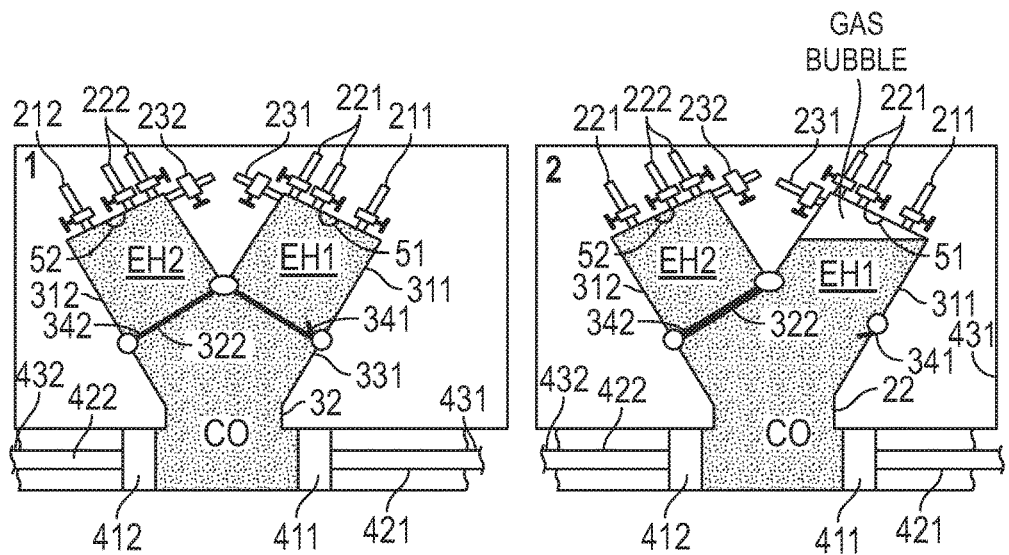
Figure 4B:
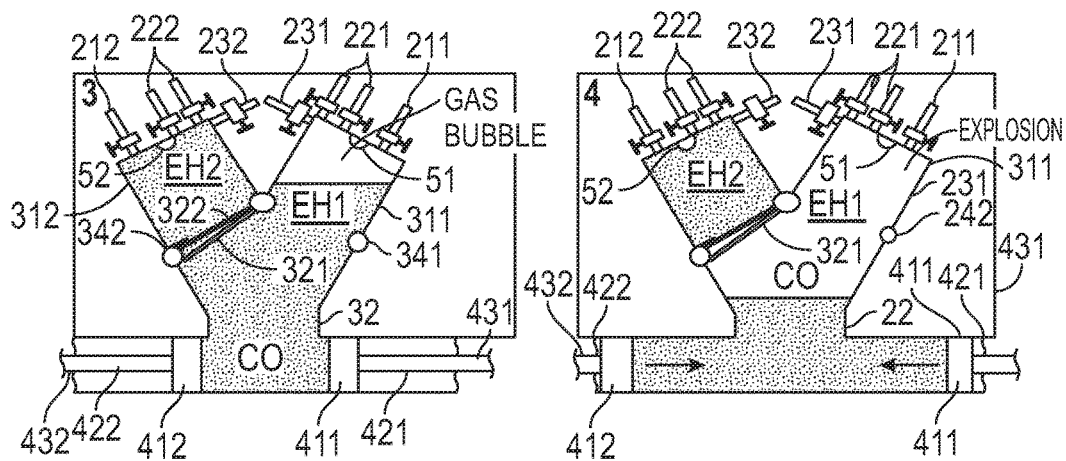
Figure 4C:
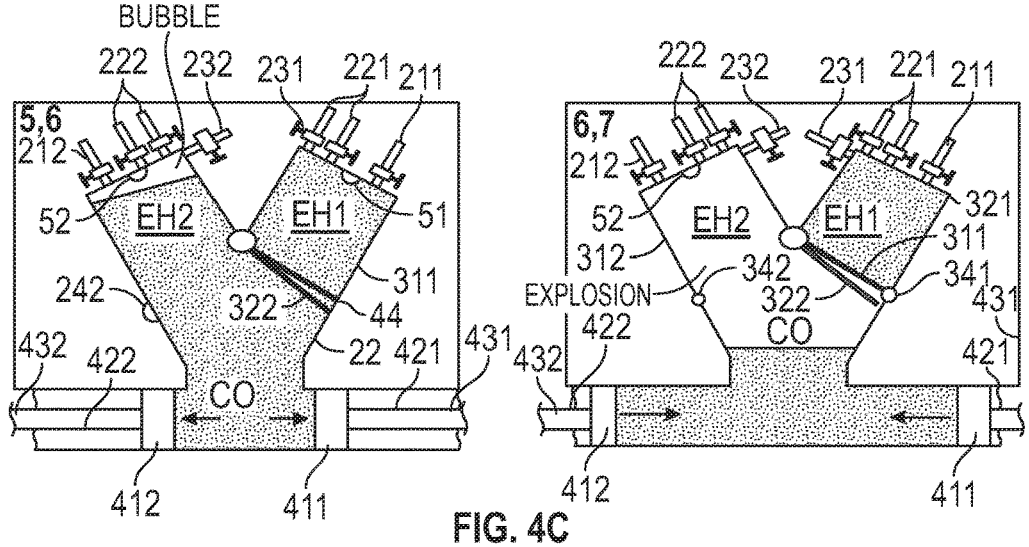

FIGS. 4 (A), 4 (B) & 4 (C) are schematic representation of different stages of working of IEEX-EM SOIC (100); SOIC with at least one CC, two pistons and two EHs working with substantially pure compressed $H_2$ gas and substantially pure $O_2$ gas in cold condition or substantially purified HHO in cold condition as fuel, and is in accordance with an embodiment of the present subject matter.

Figure 5:
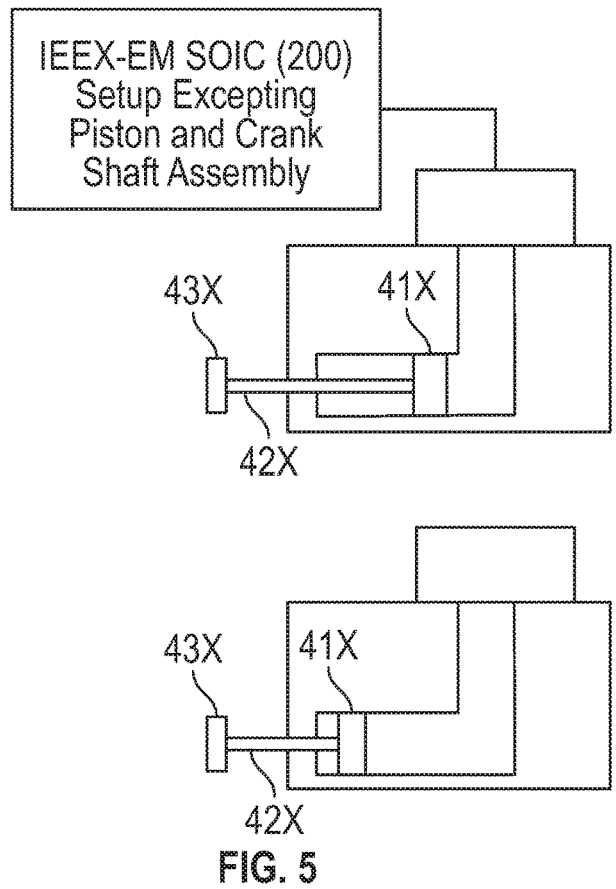

FIG. 5 is a schematic representation of different stages of working of IEEX-EM SOIC (200) engine of "L" shape with one cylinder, one piston and one engine head. IEEX-EM SOIC (200) uses substantially pure compressed $H_2$ gas and substantially pure $O_2$ gas in cold condition or substantially purified HHO in cold condition as fuel, and is in accordance with an embodiment of the present subject matter.

Figure 6:
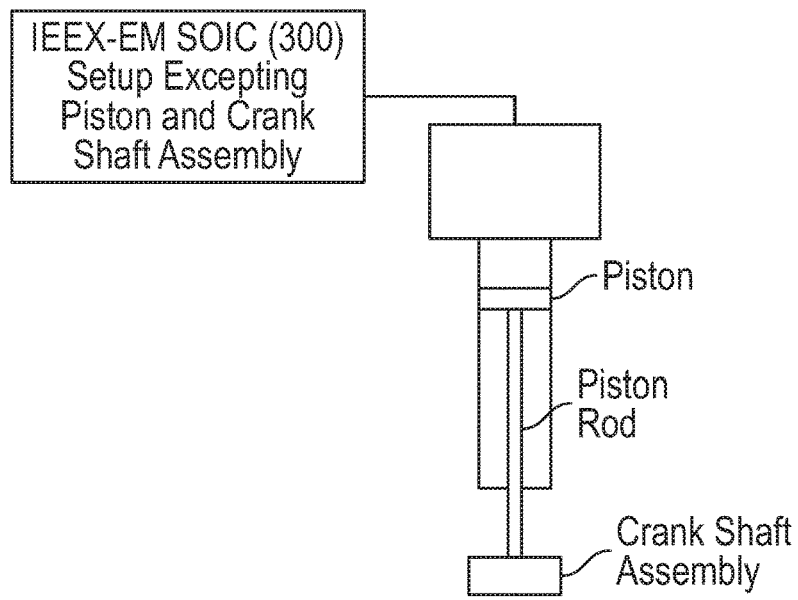

FIG. 6 is a schematic representation of working of IEEX-EM SOIC (300) engine of "I" shape with one cylinder, one piston, one CC and several EHs. IEEX-EM SOIC (300) uses substantially pure compressed $H_2$ gas and substantially pure $O_2$ gas in cold condition or substantially purified HHO in cold condition as fuel, and is in accordance with an embodiment of the present subject matter.

Figure 7:
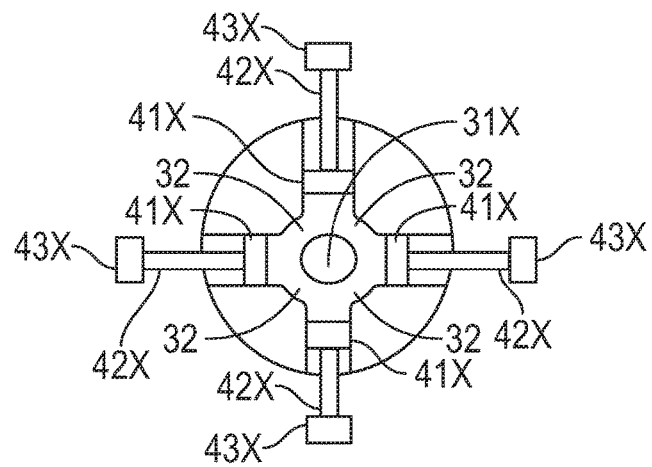

FIG. 7 is a schematic representation of working of IEEX-EM SOIC (400) engine of "O" shape with several cylinders, several pistons, one CC and several EHs. IEEX-EM SOIC (400) uses substantially pure compressed $H_2$ gas and substantially pure $O_2$ gas in cold condition or substantially purified HHO in cold condition as fuel, and is in accordance with an embodiment of the present subject matter.

Figure 8:
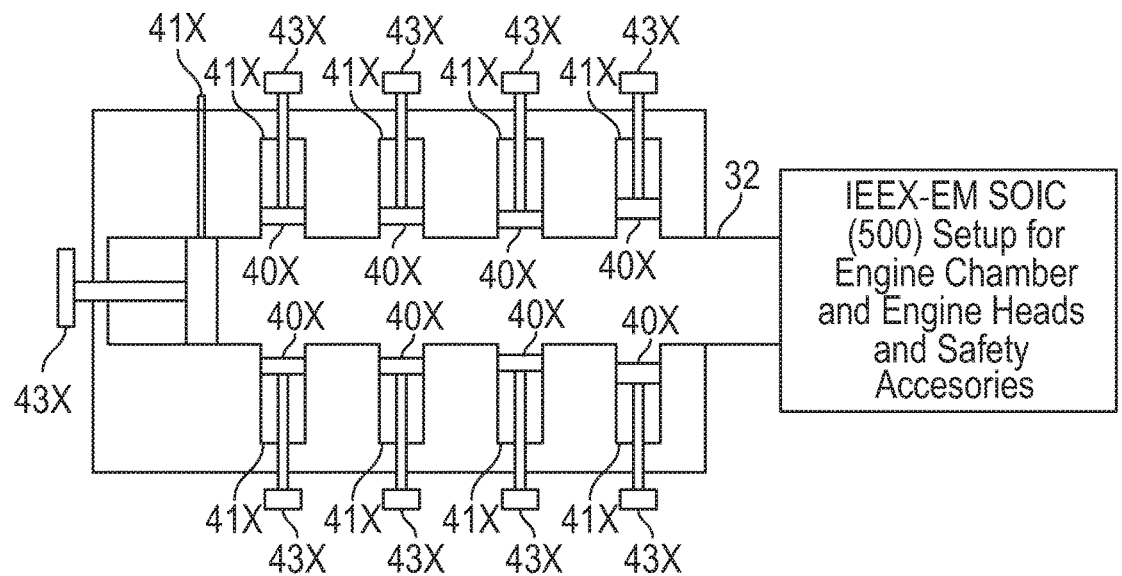

FIG. 8 is a schematic representation of working of IEEX-EM SOIC (500) engine of any shape with nine cylinders, nine pistons, nine crankshaft assemblies, one CC and several EHs. IEEX-EM SOIC (500) uses substantially pure compressed $H_2$ gas and substantially pure $O_2$ gas in cold condition or substantially purified HHO in cold condition as fuel, and is in accordance with an embodiment of the present subject matter.

Figure 9:
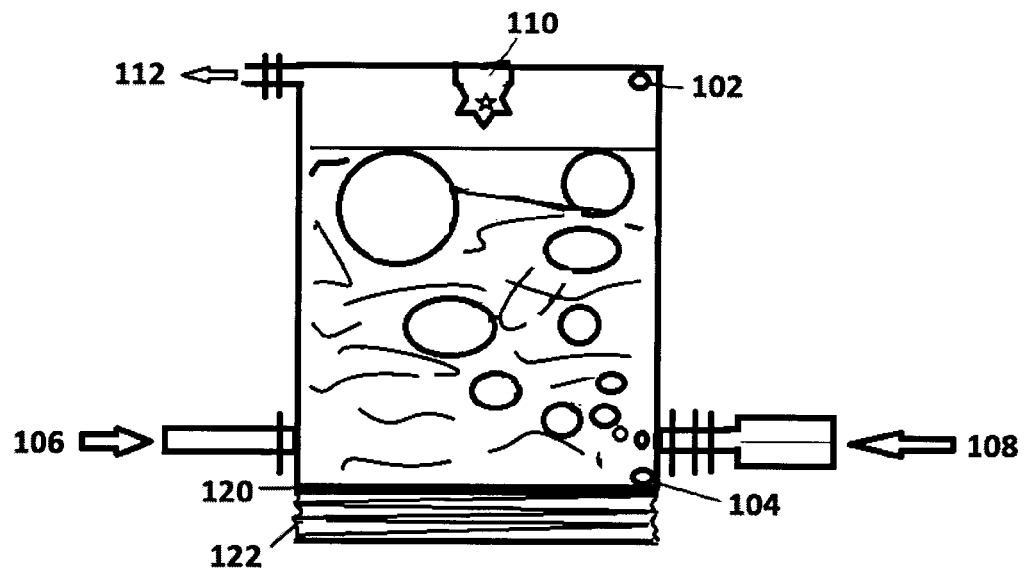

FIG. 9 is a schematic representation of working of a water filled engine head IEEX-EH (900) in accordance with an embodiment of the present subject matter.

Figure 10:
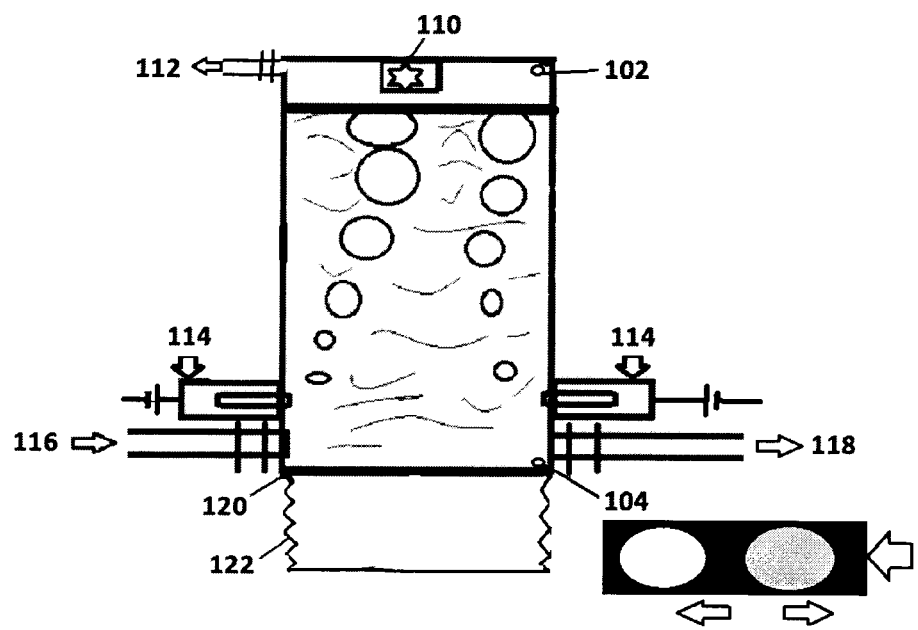

FIG. 10 is a schematic representation of working of the engine head filled with salt water and using self-electrolysis IEEX-EH (901) in accordance with another embodiment of the present subject matter.

DETAILED DESCRIPTION

The following presents a detailed description of various embodiments of the present subject matter with reference to the accompanying drawings.

The embodiments of the present subject matter are described in detail with reference to the accompanying drawings. However, the present subject matter is not limited to these embodiments, which are only provided to explain more clearly the present subject matter to the ordinarily skilled in the art of the present disclosure. In the accompanying drawings, like reference numerals are used to indicate like components.

FIGS. 1 (A), 1 (B), 1 (C), 1 (D) & 1 (E) illustrates a safe way of transporting inflammable and explosive gas through pipe system called SPS. IEEX-SM (111) SPS is safe measure to revolutionize safety while transporting potentially explosive or volatile or inflammable fluid. SPS benefits all the units using, handling, storing and/or transporting such fluids, as for example, but not limited to; several engines and other facilities using such fluids, various establishments storing and transporting such fluids on several occasions, service organisations (mobile and stationary) handling or selling potentially explosive or inflammable fluids etc. FIGS. 1 (A), 1 (B), 1 (C), 1 (D) & 1 (E) best illustrates SPS for gases and the one for liquids would require modification of the present configuration. FIGS. 1 (A), 1 (B), 1 (C), 1 (D) & 1 (E) represents SPS in the form of a chamber with three sides firmly closed and the chamber stands over a collection of water in fixed locations but may also use flexible thin membrane in movable units. Water and thin membrane on the fourth side of the chamber acts as an abundant caution against accidental insufficiency in the flow of inert gas, or sabotage. The chamber includes a main pipeline having three SGCs interconnected with pipe segments. There are three valves provided for opening and closing of the main pipeline and two valves that allow inert gas to enter the main pipeline so as to flush out gas and air from the system and to escape the main pipeline respectively. However, the configuration described herein is not limited to three SGCs and the respective valves, but can vary in number as would be required for any suitable application and in a manner appreciated by person skilled in the art. The gas in the main pipeline flows from direction A to B. The chamber allows entry of inert gas which may pass through SGC irrespective of the fact whether SGC is closed or open.

FIGS. 1 (A), 1 (B), 1 (C), 1 (D) & 1 (E) illustrates different stages of working of SPS represented in different phases from Phase I to V.

In Phase I of FIG. 1 (A); three valves of the main pipeline opens up and SGC halves shut tight and all other valves close. The gas puffs through from ISG to EH without any interruption. In Phase II of FIG. 1 (B); three valves of the main pipeline are closed and internal valves controlling the flow of inert gas opens; letting the inert gas flush the chamber and the main pipeline inside different segments of SPS. Phase III in FIG. 1 (C) operates simultaneously with the occurrence of explosion in EH which occurs at the end of the main pipeline in the direction from A to B. All SGC halves open up and inert gas continues to flush the chamber and the parts of the pipe system inside the segments of SPS. In Phase IV of FIG. 1 (D), SGC halves shut re-forming the main pipeline and the flow of inert gas also shuts down as the valves letting it flow to the chamber and parts of the main pipeline inside segments of SPS are closed. Phase V in FIG. 1 (E) is identical to Phase I with the difference that the actual flow of gas from ISG to EH awaits a central command. On receiving the command, Phase V is activated and resumes in the same manner as Phase I; and hence, the subsequent phases recommence.

Figure 1A:
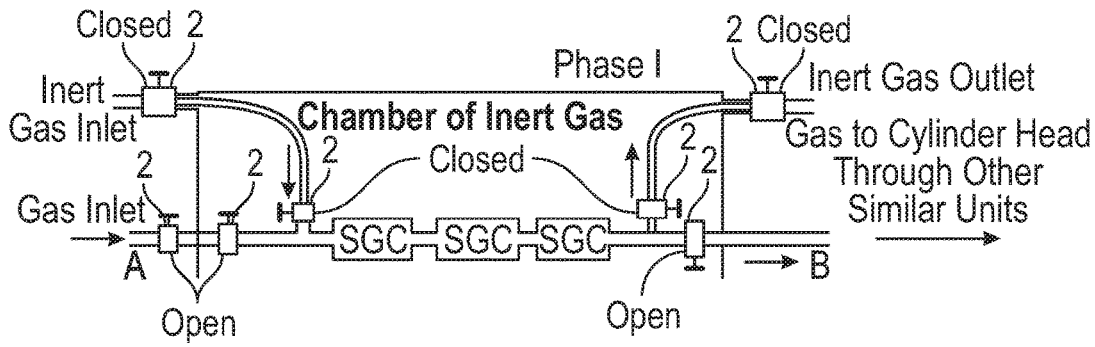
Figure 1B:
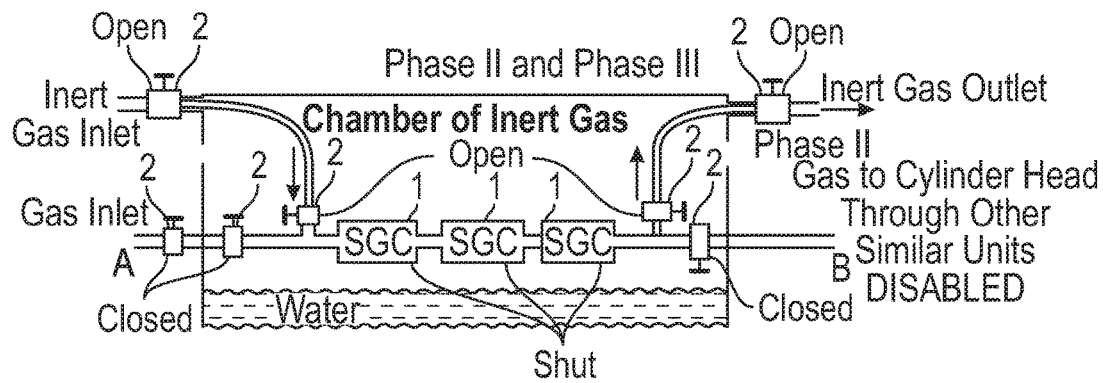
Figure 1C:
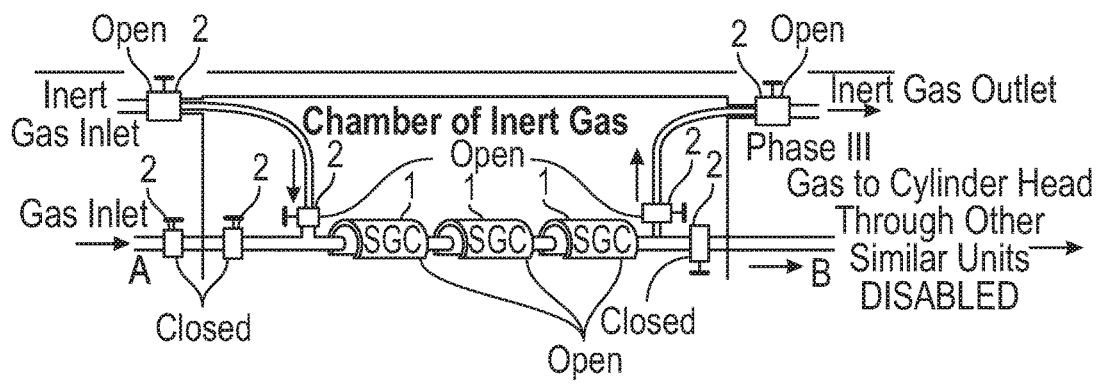
Figure 1D:
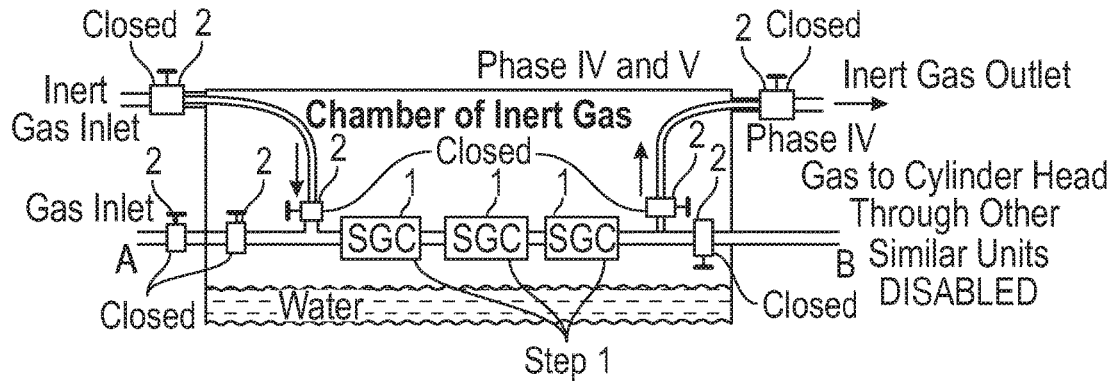
Figure 1E:
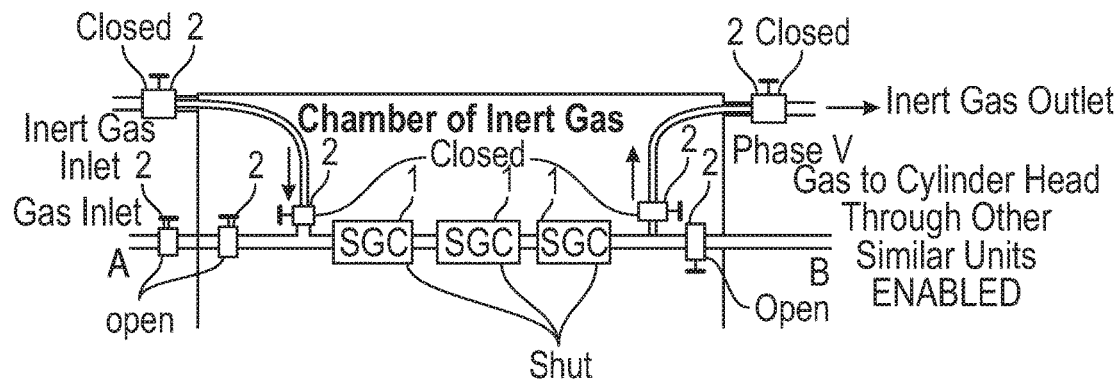
Figure 2:
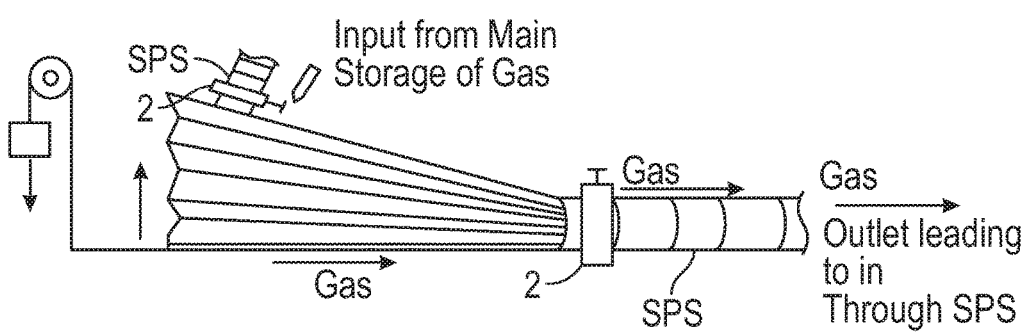
FIG. 2 is a schematic representation of working of Intermediate Storage of Gas (ISG) or IEEX-SM (222) ISG, which is Safe Measure as conceived and tried in real research and experiments. It is a key device to run any engine with $H_2$ or HHO gas, and is in accordance with an embodiment of the present subject matter.

FIG. 2 illustrates a schematic representation of the working of IEEX-SM (222) ISG to revolutionize safety from the hazards that could occur from the backlash of $H_2$ and HHO gases with the use of a simple, flexible and straightforward device. The representation of ISG looks like a bellow because the concept resembles the working of a bellow. The bellow is made of a flexible material that tears at low pressure reducing the force of an explosion if, and when; an explosion happens at ISG and that way, the main storage of gas (MSG) in the neighbourhood stays unaffected as observed during experiments conducted with prototype engines. Bellow has limited storage space and expels the gaseous content in a fast and abrupt manner. Although the working principle of ISG resembles that of an ordinary bellow, ISG requires assemblage of sophisticated measuring and timing instrumentation known in the art; so that required volume of gas (RVG) reaches EH at correct time, precise speed, specific pressure and in exact volume or weight.

Figure 3:
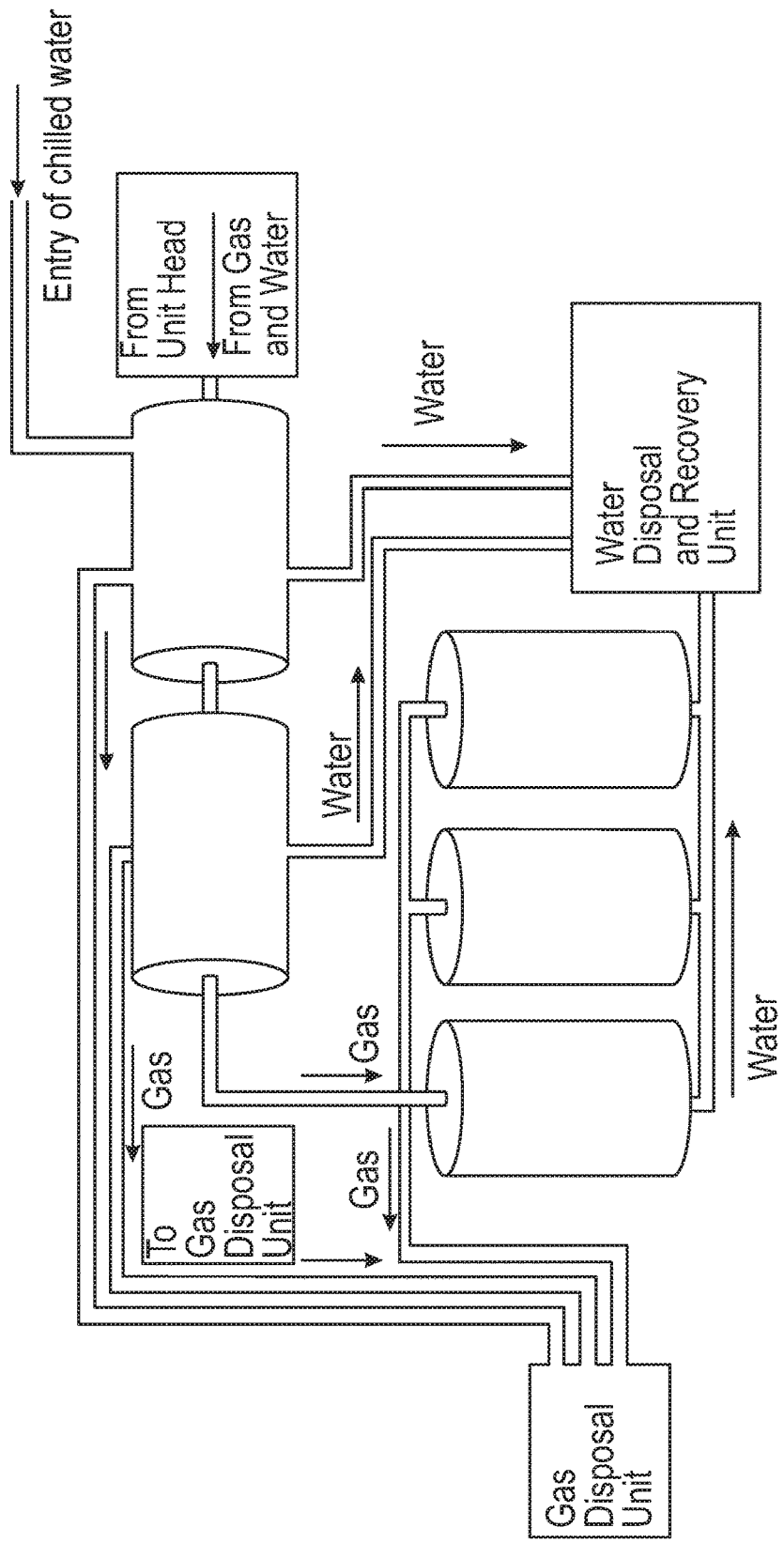
FIG. 3 is a schematic representation of different stages of working of Pre-disposal Treatment of Exhaust (PDTE) or IEEX-SM (333) PDTE which is Safe Measure as conceived and tried in real research and experiments. It is a key device to run any engine with $H_2$ or HHO gas, and is in accordance with an embodiment of the present subject matter.

FIG. 3 illustrates a schematic representation of different stages of working of IEEX-SM (333) PDTE to revolutionise safety from accidents taking place at the stage of exhaust release of $H_2$ or $O_2$ or HHO gas engines. This seemingly unlikely event of accident occurring at this stage is not really uncommon and the real experiments showed its propensity; alarming the need of stricter security and safety concerns. The exhaust unit processing in the form of PDTE ensures safety from escape of gas and steam at high temperature. PDTE cools the steam and unspent gas from the engine head with chilled water and forces the gaseous volumes to gas disposal unit through jet like contrivances and is disposed in a safe manner as is known in the art whereas, water is fed to the water disposal and recovery unit for recycling purposes.

FIGS. 4 (A), 4 (B) & 4 (C) illustrates a schematic representation of different stages of working of IEEX-EM SOIC engine (100) with one CC (32) of inverted "T" shape; and CC (32) having one vertical and two horizontal arms. The horizontal arms of CC contain CPS of two pistons (411, 412) that moves to and fro to produce torque in the manner as known in the art. The vertical arm of CC (32) bifurcates into, but not limited to EH1 & EH2 (900, 901) and can house more than two EHs according to the requirement and acknowledging economical running of engine. The working of IEEX-EM SOIC engine (100) is described in different stages i.e., from Stage 1-8. IEEX-EM SOIC engine (100) stays submerged in water that gradually warms up as the engine starts working and exothermic properties of the reaction taking place manifests. CC (32) and EHs (900, 901) in the engine (100) are continuously refilled with chilled water. FIG. 4 (A) represents EH1 (900) as the first EH to start working. In the beginning, all the valves (211, 212, 231, 232 & 222) remain closed and only the gas inlet valve (221) to EH1 (900) opens up on command and EH1 (900) lets in gas forming a bubble inside EH1 (900) and the gas inlet valve (221) remains open until EH1 (900) is full of bubble acquiring its RVG level; opening up the hatch (331) between EH1 (900) and CC (32) while the other between EH2 (901) and CC (32) stay firmly secured at its position; all the valves (211, 212, 231, 232, 221 & 222) are firmly closed; and activating the spark assembly (51) inside EH1 (900) which first triggers implosion pulling piston assembly (411, 412) firmly to the start position and explosion next inside the chamber (32) pushing the water inside EH1 (900) and CC (32) and displaces pistons (411, 412) from the start position to the end position. The pistons (411, 412) return to the start position with mechanical means known in the art and await the second explosion to reach the end position again. In the meanwhile, CC (32) and EH1 (900) gets refilled with chilled water; and the unused gas inside EH1 (900) eases out and enters the gas disposal unit through PDTE (not shown in the fig.) and simultaneously, the same process continues to happen in EH2 (901) i.e., gas bubble forms on the top of EH2 (901); opening up the hatch (332) between EH2 (901) and CC (32) and activating the spark assembly (52) inside EH2 (901) that triggers the same implosion first and explosion next phenomenon inside EH2 (901) and pushes the water present in EH2 (901) and CC (32) that causes the pistons (411, 412) to once again reach to their end positions and transmit the force of explosion to the respective crankshaft assemblies (431, 432). The force of explosion causing the water to exit with high pressure through the end of CC (32) can also be used to rotate at least one turbine or throw at least one projectile and produce energy. The same operation continues in the subsequent engine heads, if there were any, otherwise EH1 (900) reactivates. In this way, the serial operation of IEEX-EM SOIC (100) engine continues. The implosion generated heat and the repeated and continuous movement of mechanical parts raises temperature of water present within the system. The hot water and the steam thus produced can be used for various applications including, but not limited to the power plants; where the warm water surrounding SOIC (100) enters another large container of water and heated further to raise temperature of water inside the new container to two to four hundred degree Celsius and the compressed steam is used for turning steam turbines as known in the art to produce power.

IEEX-EM SOIC engine (100) submerged in water and represented graphically in FIGS. 4 (A), 4 (B) & 4 (C); includes but in no ways limited to; one cylinder (32) filled with water and continuously refilled with chilled water; one or more pistons (411, 412) connected to separate crankshaft assemblies (431,432); two or more engine heads (900, 901); and the gas inlet and outlet valves (221, 222) and (231, 232) provided to serve each engine head (900, 901) respectively; further provided with water inlet and outlet assemblies (211, 212); and the hatch separators (331, 332) separating the cylinder (32) from engine heads (900, 901) and hatch securers (341, 342) securing the hatch between cylinder (32) and engine heads (900, 901); the spark assemblies (51, 52) inside engine heads (900, 901) and also, the gas bubble (marked "Gas Bubble") is formed at top of each engine head (900, 901) alternatively. PDET systems (241,242) serve each EH separately. The subject matter viz., assemblage of gases from electrolysis, layout of gas inlet assembly, gas regulator, ignition assembly, crankshaft assembly; and transfer of linear motion of piston to produce torque; and so on are configured and carried out in the same manner as known in the art.

FIG. 5 illustrates a schematic representation of working of IEEX-EM SOIC (200) of "L" shape, which is same in essence as IEEX-EM SOIC (100); except only one piston (41X) and crankshaft assembly (43X) is employed in IEEX-EM SOIC (200) instead of two as in IEEX-EM SOIC (100). IEEX-EM SOIC (200) is applicable for all those purposes where engine miniaturisation is required.

FIG. 6 illustrates a schematic representation of working of IEEX-EM SOIC (300) of "I" shape, which is same in essence as IEEX-EM SOIC (200); except shape of the two engines. IEEX-EM SOIC (300) is also applicable for all those purposes where engine miniaturisation is required.

FIG. 7 illustrates a schematic representation of working of IEEX-EM SOIC (400) of "0" shape, which is same in essence as IEEX-EM SOIC (100); except IEEX-EM SOIC (400) works on four pistons (41X) and four sets of crankshaft assemblies (43X) instead of two as in IEEX-EM SOIC (100). Also, the chamber (32) of IEEX-EM SOIC (400) is "0" shaped and can accommodate more than four engine heads (31X) whereas chamber of IEEX-EM SOIC (100) is "Y" shaped and speculatively accommodates four to six engine heads. IEEX-EM SOIC (400) stands applicable for all those purposes where maximising engine power is desired.

FIG. 8 illustrates a schematic representation of working of IEEX-EM SOIC (500) having multiple piston assemblies (40X) and crankshaft assemblies (43X), which is same in essence as IEEX-EM SOIC (100), except that the subsidiary piston assemblies sideline the main piston assembly. This concept comes from the possibility that the design of IEEX-EM SOIC (100) has huge (colossal) proportions and the consolidated power of explosion requires pulling of many mechanical devices such as piston assemblies and crankshaft assemblies to avoid wastage of power.

The present subject matter presents an internal combustion engine (IEEX-EM) that differs from the internal combustion engines known in state-of-the art; in a manner that (IEEX-EM) of the present subject matter need not stay dependent upon a crankshaft action to repeat performance of the motive force to keep the engine running. The electronics and other devices help control the running of the engine.

Further, (IEEX-EM) of the present subject matter can produce and supply itself $H_2$ based fuel, inject fuel gas as bubbles and adjust volume and pressure of gas injected with the screwing movement of the engine head (EH) that makes (IEEX-EM).

According to an embodiment of the present subject matter, the working of the engine head IEEX-EH (900) is illustrated as shown in FIG. 9. IEEX-EH (900) is filled with water and the fuel gases $H_2$ or HHO and $O_2$ are inducted externally into the engine head i.e., using any suitable external means for transporting gases as described in above embodiments or means as known in the art. The fuel gases collect as bubbles in an upper or closed part of the engine head. The engine head IEEX-EH (900) is also provided with at least one top water level sensor (102) and at least one bottom water level sensor (104) for measuring water quantity and, then regulating the requirement of water inside IEEX-EH (900). There is also provided a water inlet (106), a gas inlet (108); and an exhaust outlet (112) in IEEX-EI-I (900) as represented in FIG. 9. The engine head IEEX-EH (900) also possess at least one sparking assembly (110) for ignition of the gaseous fuel.

The concept of working of the engine head as hereinafter described explains as to how the flow of water and gas in the engine head is regulated to have controlled and stable transmission of force and explosion inside the engine head.

The present subject matter is directed towards the configuration and functioning of the engine head IEEX-EH (900); with the engine head IEEX-EH (900) as described hereinbefore and hereinafter enabled to be engaged with the serially operating internal combustion (SOIC) engine as explained above in various embodiments.

The water from the water inlet (106) flows into the engine head IEEX-EH (900) and the valve (106) remains open till the time the top water level sensor (102) reports "FULL" i.e., on reading "FULL" the water inlet (106) closes and the gas inlet (108) opens up to replace the water present in the engine head IEEX-EH (900) by gas.

It is in accordance to an embodiment of the present subject matter that a tube (120) of IEEX-EH (900) is directed to rotate or screw or act in any other possible manner as can be conceived by a person skilled in the art and, suits the present embodiment of the subject matter. The rotation of the tube (120) of IEEX-EH (900) helps make room for the rising bubbles to deliver a required volume of fuel gases at the upper part of the engine head IEEX-EH (900). Also, a lower end of the tube (120) of IEEX-EH (900) stays temporarily closed with a sliding device (122) or any other suitable device known in the art in order to obstruct the outflow of water from the engine head IEEX-EH (900) i.e., to hold the water against gravity such that water content in IEEX-EH (900) remains unaltered while the fuel gases rise as bubbles.

On receiving the required volume of fuel gases in the upper part of IEEX-EH (900), the rotation of the tube (120) of IEEX-EH (900) and the obstruction posed at the lower end of the tube (120) as explained above comes to a halt so that the gases ignite with the sparking assembly (110).

Prior to ignition of the fuel gases all valves (106, 108, 112) connecting to the openings to the engine head IEEX-EH (900) close except for the lower end of IEEX-EH (900). The lower end opposite to the closed end of IEEX-EH (900) which had temporarily remain blocked to obstruct the outflow of water from IEEX-EH (900) until the ignition takes place; receives a command in synchronicity with the ignition that sets the lower end of IEEX-EH (900) to open. The phenomenon of the closing of valves (106, 108, 112) takes place on the bottom water level sensor (104) reporting "NO WATER".

The gases on igniting combine at a very high speed and the high temperatures inherent to the chemistry of union of hydrogen with oxygen causes steam to expand with great rapidity and thus, resulting in a significant explosion. The water inside EH is temporarily kept in place by the implosive property of the union of hydrogen and oxygen that reduces the gaseous volume to one third level and produces steam that expands and explodes with the intense exothermic heat of the chemical reaction.

The explosion then causes a great thrust to push water and air ahead through the lower end of IEEX-EH (900); which is now open and clear of any obstructions. The thrust generated is utilised to activate piston; rotate turbine or throw projectile in the manner as described in above embodiments.

On completion of the event of generation of thrust, the engine head IEEX-EH (900) returns to the initial position and let the second and subsequent cycles of gas-ignition-explosion-thrust take place in the manner as described in above embodiments.

After the explosion has occurred, the engine head IEEX-EH (900) is refilled with water and all the unspent gases are directed towards the exhaust disposal and/or treatment unit as described in above embodiments. Also, the outlet valve (112) towards the exhaust treatment unit remains open till the time the top water level sensor (102) reports "FULL" and, is closed and firmly secured thereafter allowing the entire inlet and outlet process to continue in the manner sought after.

It is in accordance with another embodiment of the present subject matter that the engine head IEEX-EH (901) makes use of the principle of electrolysis of salt water for producing and directly transporting hydrogen gas and oxygen to the engine head IEEX-EH (901) as represented in FIG. 10 and, thus eliminating the need for separate transportation system required for transporting gas with the hazards of escaping gas causing explosion unwantedly.

FIG. 10 is a schematic representation of the working of an engine head IEEX-EH (901) which is a salt water filled engine head in accordance with an embodiment of the present subject matter. The engine head IEEX-EH (901) derives fuel gases $H_2$, HHO and $O_2$ through self-electrolysis as assisted and initiated by an electrode assembly (114) placed in or in close proximity of IEEX-EH (901). The engine head IEEX-EH (901) is provided with an inlet for salt water (116), an outlet for salt water (118); and an outlet (112) for exhaust. The engine head IEEX-EH (901) is further provided with at least one top water level sensor (102) and at least one bottom water level sensor (104) for measuring salt water quantity and, then regulating the requirement of salt water inside IEEX-EH (901); and also possess at least one sparking assembly (110).

In one embodiment of the present subject matter, the electrode assembly (114) is placed on sides of the engine head IEEX-EH (901). However, the location of the electrode assembly (114) is subjected to variations and can best be chosen as per the requirement of the system. An electrical potential is applied across a pair of electrodes immersed in the electrolyte i.e., salt water and the salt water on electrolysis decomposes into oxygen ($O_2$) and hydrogen ($H_2$) gas.

The engine head IEEX-EH (901); similar to the engine head IEEX-EH (900) let the bubbles of fuel gases that are derived from the electrolysis of salt water to collect in the upper part of the engine head. A tube (120) of IEEX-EH (901) is then directed to rotate or screw or act in any other possible manner as can be conceived by a person skilled in the art and, suits the present embodiment of the subject matter. The rotation of the tube (120) of IEEX-EH (901) helps make room for the rising bubbles to deliver a required volume of fuel gases at the upper part of the engine head IEEX-EH (901). Also, the lower end of the tube (120) of IEEX-EH (901) stays temporarily closed with sliding device (122) or any other suitable device known in the art in order to obstruct the outflow of salt water from the engine head IEEX-EH (901) such that salt water content in IEEX-EH (901) remains unaltered while the fuel gases rise as bubbles.

On receiving the required volume of fuel gases in the upper part of IEEX-EH (901), the rotation of the tube of IEEX-EH (901) and the obstruction posed at the lower end of the tube as explained above comes to a halt so that the gases ignite with the sparking assembly (110).

Prior to ignition of the fuel gases; all valves (116, 118, 112) connecting to the openings to the engine head IEEX-EH (901) close; except for the lower end of IEEX-EH (901). The lower end opposite to the closed end of IEEX-EH (901) which had temporarily remain blocked to obstruct the outflow of salt water from IEEX-EH (901) by gravity until the ignition takes place; receives a command in synchronicity with the ignition that sets the lower end of IEEX-EH (901) to open. The salt water inside EH is temporarily kept in place by the implosive property of the union of hydrogen and oxygen that reduces the gaseous volume to one third level and produces steam that expands and explodes with the intense exothermic heat of the chemical reaction.

The phenomenon of the closing of valves (116, 118) takes place on the bottom water level sensor (104) reporting "NO WATER".

The explosion then causes a great thrust to push water and air ahead through the lower end of IEEX-EH (901); which is now open and clear of any obstructions. The thrust generated is utilised to activate piston; rotate turbine or throw projectile in the manner as described in above embodiments.

On completion of the event of generation of thrust, the engine head IEEX-EH (901) returns to the initial position and let the second and subsequent cycles of gas-ignition-explosion-thrust take place in the manner as described in above embodiments.

After the explosion has occurred, the engine head IEEX-EH (901) is refilled with salt water and all the unspent gases are directed towards the exhaust disposal and/or treatment unit as described in above embodiments. Also, the outlet valve (112) towards the exhaust treatment unit remains open till the time the top water level sensor (102) reports "FULL" and, is closed and firmly secured thereafter allowing the entire inlet and outlet process to continue in the manner sought after.

It is to be understood that the above described embodiments are merely illustrative principles of the present subject matter and that many variations may be devised by those skilled in the art without departing from the scope of the present subject matter. It is, therefore, intended that such variations be included with the scope of the claims.

I claim:

1. An implosion enabled engine of exothermic type in explosive system (IEEX-EM) operating as serially operating internal combustion (SOIC) engine, the IEEX-EM comprising at least one cylinder filled with water;
    one or more piston assemblies connected to one or more crankshaft assemblies to produce torque;
    at least one outlet for exhaust of water under pressure to rotate at least one turbine or throw at least one projectile using the power of explosion;
    one or more engine heads filled with water;
    at least one gas inlet and one gas outlet valve for said each engine head;
    at least one hatch separator for separating said at least one cylinder—from said each engine head; and
    at least one sparking assembly to ignite mixture of fuel and air in said each engine head.

2. The implosion enabled engine of exothermic type in explosive system (IEEXEM) as claimed in claim 1, wherein said at least one cylinder and said one or more engine heads are continuously refilled with chilled water.

3. The implosion enabled engine of exothermic type in explosive system (IEEXEM) as claimed in claim 1, wherein at least two pistons are connected to at least two crankshafts—by at least two piston rods respectively.

4. The implosion enabled engine of exothermic type in explosive system (IEEXEM) as claimed in claim 1, wherein said serially operating internal combustion (SOIC) engine is one selected from group consisting of "Y" shaped, L" shaped, "I" shaped, "O" shaped.

5. The implosion enabled engine of exothermic type in explosive system (IEEXEM) as claimed in claim 1, comprising two engine heads filled with water.

6. The implosion enabled engine of exothermic type in explosive system (IEEXEM) as claimed in claim 1, comprising one or more water inlet and outlet valves.

7. The implosion enabled engine of exothermic type in explosive system (IEEX-EM) as claimed in claim 1, comprising at least one hatch securer for securing hatch between said at least one cylinder and said each engine head.

8. The implosion enabled engine of exothermic type in explosive system (IEEXEM) as claimed in any one of the preceding claims, wherein
    said one or more engine heads on receiving the required volume of gas (RVG) forms a bubble of explodable gas in the upper part; and on receipt of specific command, said at least one sparking assembly activates to create implosion first and explosion next inside the bubble causing said at least one hatch securer securing hatch between said at least one cylinder and said each engine head to open and stay fixed and explosive power pushing said one or more piston assemblies transferring the force of explosion to said one or more crankshaft assemblies to produce torque.

* * * * *